United States Patent [11] 3,620,595

[72] Inventors Russell W. Loop
  Bartlett, Ill.;
  Max Tongier, Jr., Williamsburg; Clarence D. Cone, Jr., Yorktown, Va.
[21] Appl. No. 16,808
[22] Filed Mar. 5, 1970
[45] Patented Nov. 16, 1971
[73] Assignee The United States of America as represented by the Administrator of the National Aeronautics and Space Administration

[54] ABSOLUTE FOCUS LOCK FOR MICROSCOPES
  3 Claims, 3 Drawing Figs.
[52] U.S. Cl. .................................................. 350/86, 33/174 S
[51] Int. Cl. ............................................... G02b 21/26
[50] Field of Search ........................................ 350/82, 86, 90; 250/49.5 B; 33/174 S

[56] References Cited
UNITED STATES PATENTS
1,007,978 11/1911 Sauveur..................... 350/90
2,296,674 9/1942 Ingels ....................... 33/174 S Primary Examiner—David Schonberg
Assistant Examiner—Robert L. Sherman
Attorneys—Howard J. Osborn, Wallace J. Nelson and G. T. McCoy ABSTRACT: An apparatus for securing absolute arrest and immobilization of the specimen stage of a microscope in a preset state of focus to thereby preserve the focus over an extended period of time.

PATENTED NOV 16 1971 3,620,595

INVENTORS
RUSSELL W. LOOP
MAX TONGIER, JR.
BY CLARENCE D. CONE, JR

ATTORNEYS

3,620,595

ABSOLUTE FOCUS LOCK FOR MICROSCOPES

ORIGIN OF THE INVENTION

This invention was made by a former employee and present employees of the National Aeronautics and Space Administration and may be manufactured and used by and for the Government of the United States of America for governmental purposes without the payment of any royalties thereon or therefor.

Most microscopes maintain a set focus only for very short periods of time, since the stage is held stationary simply by the static friction in the fine adjustment rack and pinion arrangement. Over extended periods, the constant action of the stage weight, particularly when coupled with heavy culture chambers employed in cinephotography, causes a gradual downward creeping of the stage and focus is lost. This adverse characteristic is absolutely intolerable in cases where focus must be held for days at a time, in particular, in time-lapse cinephotography of biological specimens using microscopes where absolute focus must be rigidly maintained over very long periods, especially when constant attention for focusing by technicians is not possible. The present invention alleviates all need for checking focus once it has been set and will maintain the stage in a fixed position indefinitely, even under adverse conditions of vibration, etc. This invention can be readily applied to any make of microscopes and requires no modification whatsoever to the microscope.

It is therefore an object of the present invention to provide an absolute focus lock for microscopes.

Another object of the present invention is a device for use with microscopes that will eliminate specimen stage creep once a focus is set.

Another object of the present invention is a device for locking the focus on a microscope used in time-laspe cinephotography of biological specimens.

These and other objects are attained according to the present invention by providing an adjustable height bar, having a bearing surface thereon to positively engage the rack portion of a specimen stage. This elongated bar is provided with a flat upper face and has a rounding cylindrical fulcrum bearing surface depending from one end thereof with an adjustable thumb screw extending through the other end thereof. An objective compensator of cylindrical configuration is threadingly received by a threaded member extending perpendicular from the flat bar face. This objective compensator is provided with a hemispherical bearing surface at the free end thereof for engagement with the rack portion of the microscope stage after the microscope has been set to the desired focus and the thumb screw has been tightened so as to raise the bearing surface of the cylinder into firm contact with the stage.

A more complete appreciation of the invention and many of the attendant advantages thereof will be more clearly understood by reference to the following detailed description when considered in connection with the accompanying drawings wherein.

Figure 1:
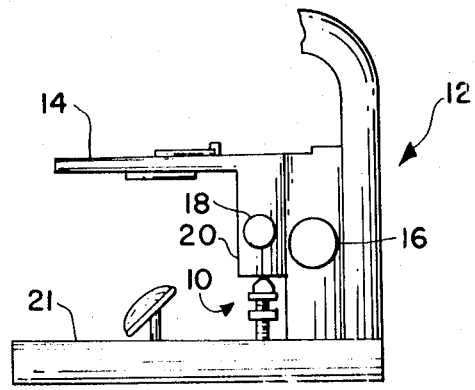
FIG. 1 is a part side view of a microscope employing the focus lock of the present invention.

Referring now to the drawings, and more particularly to FIG. 1 the focus lock of the present invention, generally designated by the reference numerical 10, is shown in position on a microscope generally designated by reference numeral 12. Microscope 12 includes a specimen support stage 14 that is adjustable in height to obtain an accurate focus by the microscope lens system not shown. A conventional coarse adjustment screw 16 and a fine adjustment screw 18 are provided for moving the rack portion 20 of stage 14. The focus lock 10 of the present invention is positioned beneath rack portion 20 on surface 21 of microscope 12 and adapted to bear against rack 20 to prevent creep thereof.

Figure 2:
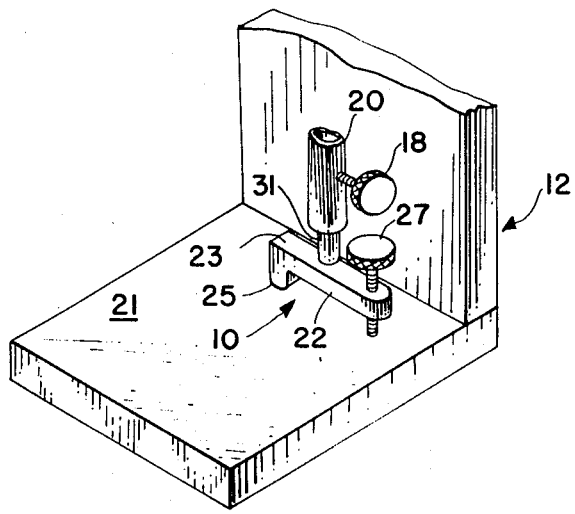
FIG. 2 is another view of the focus lock in position on a microscope with parts omitted for clarity.
Figure 3:
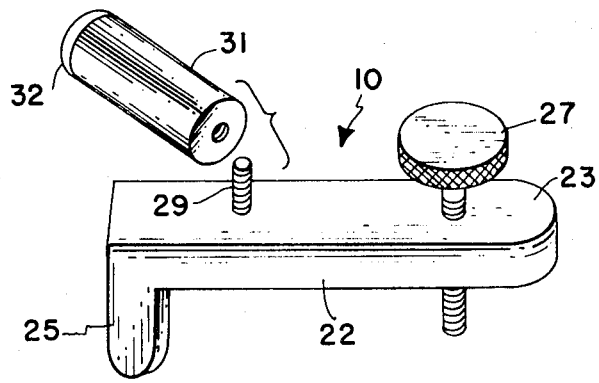
FIG. 3 is another view of the focus lock of the present invention showing the interchangeable cylindrical objective compensator.

Referring now more particularly to FIGS. 2 and 3, it will be seen that focus lock 10 includes an elongated bar portion 22 having a flat top face surface 23 thereon. A rounded cylindrical fulcrum bearing surface 25 is integral with and depends from bar member 22 at one end thereof. A thumb screw 27 extends through the other end of bar 22 and this screw and fulcrum bearing surface 25 are adapted to engage surface 21 of microscope 12. A threaded member 29 is integral with flat face 23 of bar 22 and extends perpendicular therefrom. An objective compensator 31 of cylindrical configuration is threadingly received by threaded member 29 and is provided with a hemispherical bearing surface 32 for engagement with rack portion 20 of microscope 12. Objective compensator 31 is readily removable from bar 22 and compensators of different lengths for different objective lenses are provided with each focus lock 10.

OPERATION

The operation of the invention is now believed apparent. When it is desired to maintain a set focus for a long period of time, as in time-lapse cinephotography of biological specimens, an absolute focus must be rigidly maintained over a long period to obtain accurate photographs. Absolute focus maintenance is critical at the higher magnifications (25X to 40X) normally employed in cinephotography. Thus, microscope 12 would be initially focused and the mechanism for obtaining the photographs attached. Focus lock 10 is then placed in position as shown in FIGS. 1 and 2 with the desired objective compensator 31 being attached to bar 22. Thumbscrew 27 is then tightened sufficiently for hemispherical surface 32 on compensator 31 to engage rack portion 20 to provide a positive force against the rack and thereby prevent any tendency of specimen stage 14 to creep.

Although the invention has been described relative to a specific embodiment thereof, it is not so limited and numerous variations and modifications thereof are considered within the scope of the invention. No specific materials have been mentioned for making the invention and the use of any suitable plastics or metal to construct the various parts is considered within the scope of the invention.

What is claimed as new and desired to be secured by Letters Patent of the United States is:

1. In combination with a microscope that is adapted for time-lapse cinephotography of biological specimens, an apparatus for securing absolute arrest and immobilization of the microscope specimen stage in a present state of focus to thereby preserve focus over an indefinite period of time comprising a longitudinal body portion, a rounding cylindrical fulcrum depending from said body at one end thereof and adapted to engage structure on the microscope located beneath the specimen stage, a thumb screw extending through the other end of said body and also adapted to engage microscope structure located beneath the specimen stage, a threaded member mounted on the top face of said body member and extending upward therefrom, a cylindrical member threadingly mounted on said threaded member, said cylindrical member being provided with a hemispherical bearing surface at the free end thereof, said hemispherical bearing surface at the free end thereof, said hemispherical bearing surface adapted to engage the rack portion of the microscope stage and thereby prevent creep of the stage.

2. An apparatus for securing absolute arrest and immobilization of a microscope specimen state in a preset state of focus to thereby preserve the present focus over an infinite period of time comprising:
  an elongated bar having a flat face surface thereon,
  a rounding cylindrical fulcrum depending from said bar at one end thereof and adapted to engage structure on a microscope located beneath the microscope specimen stage, a thumbscrew extending through a tapped opening in the other end of said bar and also adapted to engage microscope structure located beneath the specimen stage, a threaded member mounted on the flat face of said bar and extending upward therefrom, a cylindrical member threadingly mounted on said threaded member, said cylindrical member being provided with a hemispherical bearing end surface, said hemispherical bearing surface adapted to engage the rack portion of the microscope stage and thereby prevent creep of the stage after said stage is set in a preset focus.

3. Apparatus for absolutely locking the focus on a microscope wherein the specimen stage of the microscope is normally held in focus by the static friction of the fine-adjustment rack and pinion arrangement, comprising:

bearing means positionable beneath the rack portion of the microscope, said bearing means being supported by fixed structure on the microscope, adjustable means for adjusting the height of said bearing means relative to the fixed structure of the microscope to thereby cause said bearing means to engage the rack and provide positive forces acting against any tendency of the rack to creep after the focus is obtained on the microscope, wherein said adjustable means includes an elongated body member, a rounding cylindrical fulcrum integral with and depending from said elongated body at one end thereof, said rounding cylindrical fulcrum serving to contact fixed structure on the microscope, a thumbscrew extending through the other end of said elongated body and also adapted to contact the fixed structure on the microscope, said bearing means being a cylinder having a hemispherical surface at one end thereof for engagement with the rack of of the microscope, and the other end of said cylinder being threadingly received by a threaded member integral with and extending perpendicularly from structure of said adjustable means.

* * * * *